US005253542A

United States Patent [19]

Houze

[11] Patent Number: 5,253,542

[45] Date of Patent: Oct. 19, 1993

[54] VARIABLE MOMENT VIBRATOR USABLE FOR DRIVING OBJECTS INTO THE GROUND

[75] Inventor: Christian Houze, Paris, France

[73] Assignee: Procedes Techniques de Construction, Pantin, France

[21] Appl. No.: 913,496

[22] Filed: Jul. 14, 1992

[30] Foreign Application Priority Data

Jul. 15, 1991 [FR] France ................................ 91 09253

[51] Int. Cl.[5] ........................ F16H 33/20; E02D 7/18

[52] U.S. Cl. .......................................... 74/61; 74/395; 366/116; 366/128; 173/49

[58] Field of Search ...................... 74/61, 395; 173/49; 175/55; 366/116, 128

[56] References Cited

U.S. PATENT DOCUMENTS

| | | | |
|---|---|---|---|
| 3,433,311 | 3/1969 | Lebelle | 175/55 X |
| 3,564,932 | 2/1971 | Lebelle | 74/61 |
| 4,113,034 | 9/1978 | Carlson | 74/61 X |
| 4,771,645 | 9/1988 | Persson | 366/128 X |
| 4,978,488 | 12/1990 | Wallace | 366/128 X |
| 5,010,778 | 4/1991 | Riedl | 366/128 X |

FOREIGN PATENT DOCUMENTS

| | | |
|---|---|---|
| 1566358 | 2/1968 | France . |
| 177427 | 10/1984 | Japan . |
| 89/07988 | 9/1989 | World Int. Prop. O. . |
| 91/08842 | 6/1991 | World Int. Prop. O. . |

*Primary Examiner*—Allan D. Herrmann
*Attorney, Agent, or Firm*—Browdy and Neimark

[57] ABSTRACT

A vibrator has two series of eccentric weights each comprising at least two weights turning in opposite directions and at least one motor coupled to the first series of weights by gearing and to the second series of weights by a transmission device including a phase-shifter in the form of two coaxial shafts each comprising helical teeth and an annular piston which slides between the two shafts, delimiting therewith at least one working chamber into which a pressurized hydraulic fluid can be injected. The piston has helical teeth meshing with those on the two shafts. The vibrator enables self-regulation of the amplitude of the vibrations that it produces according to the behavior of the object to which the vibrations are imparted.

12 Claims, 4 Drawing Sheets

VARIABLE MOMENT VIBRATOR USABLE FOR DRIVING OBJECTS INTO THE GROUND

BACKGROUND OF THE INVENTION

1. Field of the Invention

The present invention concerns a variable moment vibrator usable in particular, but not exclusively, for driving objects such as piles and sheeting piles into the ground.

2. Description of the Prior Art

Vibrators routinely used in this kind of application employ at least one pair of rotating eccentric weights and means for rotating their drive shafts at the same speed in opposite directions.

It is clear that with such arrangements the centrifugal forces generated by the rotation of the weights add in a direction defining a working axis and compensate each other in other directions, cancelling out in a direction perpendicular to the working axis.

For many reasons it is desirable to be able to adjust the amplitude of the vibrations generated by the vibrator, for example to allow for the mechanical characteristics of the soil, and to obtain the optimum efficiency.

The first solution that comes to mind for carrying out such adjustment is to vary the rotation speed of the weights using variable speed drive means. However, in this particular field of application variable speed drive means (usually hydraulic motors) are bulky, often too costly and possibly too fragile so that in practise this solution is not used.

Another drawback of conventional vibrators (also found in variable speed vibrators) results from the fact that on starting up the speed of the weights increases progressively to the nominal speed and during this period the speed passes through critical values related to resonant frequencies of the mechanical system. The resulting transient phenomena may damage the components. The same phenomena occur when the vibrator slows down on being turned off.

Another solution, proposed in U.S. Pat. No. 3,564,932 is to use a structure comprising at least two series of weights each comprising at least one pair of eccentric weights rotating in opposite directions, using a Pecqueur epicyclic gear to achieve an angular phase-shift between the two series of weights. This solution is ruled out because of the excessive gearing that it requires and because of the resulting drawbacks with regard to cost and problems of wear. It has never been put into practise.

Other solutions disclosed in the application WO-A-8 907 988 or in the Japanese application JP-A-59 177 427 propose coupling coaxial eccentrics by means of a rotary linkage using two rotary members movable axially relative to each other against the action of a spring by a pressurized fluid. One of these members comprises a helical groove and the other comprises a finger inserted in the groove so that axial displacement of one part relative to the other causes relative rotation of the two parts.

It is found that this solution has a number of drawbacks.

Firstly, the mechanical finger/groove coupling employed cannot be used in a vibrator because of the very small dimensions of the surfaces of contact between the finger and the groove. For this reason the phase-shifter is unable to withstand the vibrations produced by the vibrator.

This drawback is all the more accentuated if the phase-shifter is directly coupled to the eccentric weights and so is subjected to high stresses (resulting from the centrifugal forces generated by the eccentric weights, which can exceed ten tons).

Another drawback of known systems is that they provide no way of adapting the vibrational power transmitted to the working conditions of the tool to which the vibrations are applied and to the characteristics of the power source.

A particular object of the invention is to eliminate these drawbacks.

SUMMARY OF THE INVENTION

The present invention consists in a variable moment vibrator usable for driving objects into the ground comprising at least two series of eccentric weights each comprising at least two eccentric weights rotating about shafts to which are fastened respective gears which mesh with each other so as to rotate in opposite directions and a drive system comprising a first motor coupled to said first series of weights by first gearing and to said second series of weights by a transmission device separate from said first gearing and incorporating a phase-shifter comprising:

- a first transmission shaft mounted to rotate on a fixed structure and comprising at least one portion in the form of a cylindrical sleeve whose internal bore comprises a first sealing surface and a first internally screwthreaded part with helical teeth;
- a cylindrical second transmission shaft mounted to rotate coaxially with said first transmission shaft and delimiting therewith an annular space closed at one end by an end wall, said second transmission shaft comprising a second sealing surface and a first externally screwthreaded part with helical teeth;
- an annular piston member axially mobile in said annular space and having a cylindrical external surface comprising in succession a third sealing surface adapted to slide in fluid-tight manner on said first sealing surface and a second externally screwthreaded part having helical teeth meshing with the teeth of the first internally screwthreaded part and an inside surface comprising in succession a fourth sealing surface adapted to slide in fluid-tight manner on said second sealing surface and a second internally screwthreaded part having helical teeth meshing with the helical teeth of the first externally screwthreaded part; and
- a pressurized fluid inlet circuit comprising an axial passage in said second transmission shaft which discharges at one end into a working chamber delimited by the two transmission shafts and the annular member and at the other end into a distribution passage via a rotary seal mounted at the end of said second transmission shaft.

The device may further comprise a secondary working chamber supplied with pressurized fluid through a second rotary seal.

The inlet circuit is designed to enable self-regulation of the phase-shift and consequently of the vibrational power transmitted by the vibrator.

One embodiment of the invention is described hereinafter by way of non-limiting example with reference to the appended drawings.

DETAILED DESCRIPTION OF THE INVENTION

Figures 1, 2, 3:
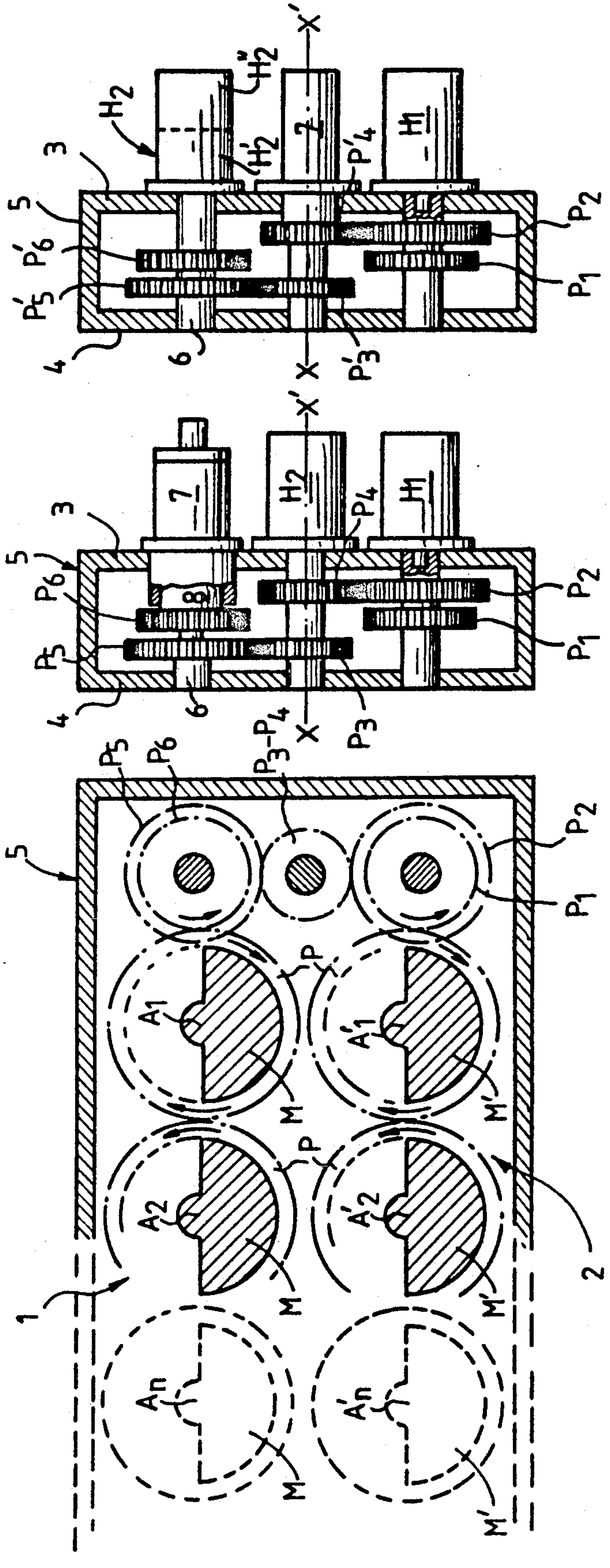
FIGS. 1 and 2 are respectively axial and transverse diagrammatic cross-sectional views of a variable moment vibrator in accordance with the invention.
FIG. 3 is an axial diagrammatic cross-sectional view of an alternative embodiment of a vibrator whose transverse cross-section is as shown in FIG. 2.

In the example shown in FIGS. 1 and 2, the vibrator comprises two series 1, 2 of eccentric weights rotatable on shafts $A_1$, $A_2$, $A_n$–$A'_1$, $A'_2$, $A'_n$ parallel to a transverse axis X, X' and whose ends are inserted in bearings carried by two parallel flanges 3, 4 constituting the two lateral sides of a casing 5.

Gears P associated with each weight M, M' are so disposed and sized that the gears P associated with the same series 1, 2 of weights M mesh with each other in successive pairs.

FIG. 2 shows two series of weights M each comprising a pair of weight M/gear P systems shown in full line, the system shown partly in chain-dotted line indicating how another pair is incorporated.

The two series of weights are rotated by a drive system comprising two hydraulic motors $H_1$, $H_2$ mounted on the flange 3 at one end of the casing 5.

The motors $H_1$, $H_2$ drive respective parallel shafts in bearings attached to the flanges 3, 4 and which each carry two coaxial gears $P_1$, $P_2$–$P_3$, $P_4$.

The gears $P_2$ and $P_4$ mesh to provide a rigid (slip-free) coupling between the motors $H_1$, $H_2$.

The gear $P_1$ meshes with the gear P fastened to the weight M to rotate the series 2.

The gear $P_3$ meshes with a gear $P_5$ fastened to the driven shaft 6 of a hydraulically operated phase-shifter 7 of the kind shown in FIG. 3. The phase-shifter 7 further comprises a driving shaft 8 coaxial with the driven shaft 6 carrying a gear $P_6$ meshing with the gear fastened to the weight M of the series 1.

It is clear that all the shafts of this structure are parallel and mounted in bearings fastened to the flanges 3, 4 and that the shafts driven directly by the motors $H_1$, $H_2$ and the two coaxial shafts 6, 8 of the phase-shifter 7 are separate from the shafts on which the weights M are mounted. Because of this the most fragile parts of the vibrator which are also the parts most subject to wear are for the most part isolated from the high stresses occurring at the weights M and their drive shaft $A_1$ . . . $A_n$–$A'_1$ . . . $A'_n$.

It is also clear that the drive system (motors $H_1$, $H_2$) and the mechanism of the phase-shifter 7 are grouped together on the flange 3 so that the five other sides of the casing 5 of the vibrator are free of any bulky apparatus (motor, phase-shifter) and can therefore constitute working or bearing surfaces of the vibrator.

Figure 4:
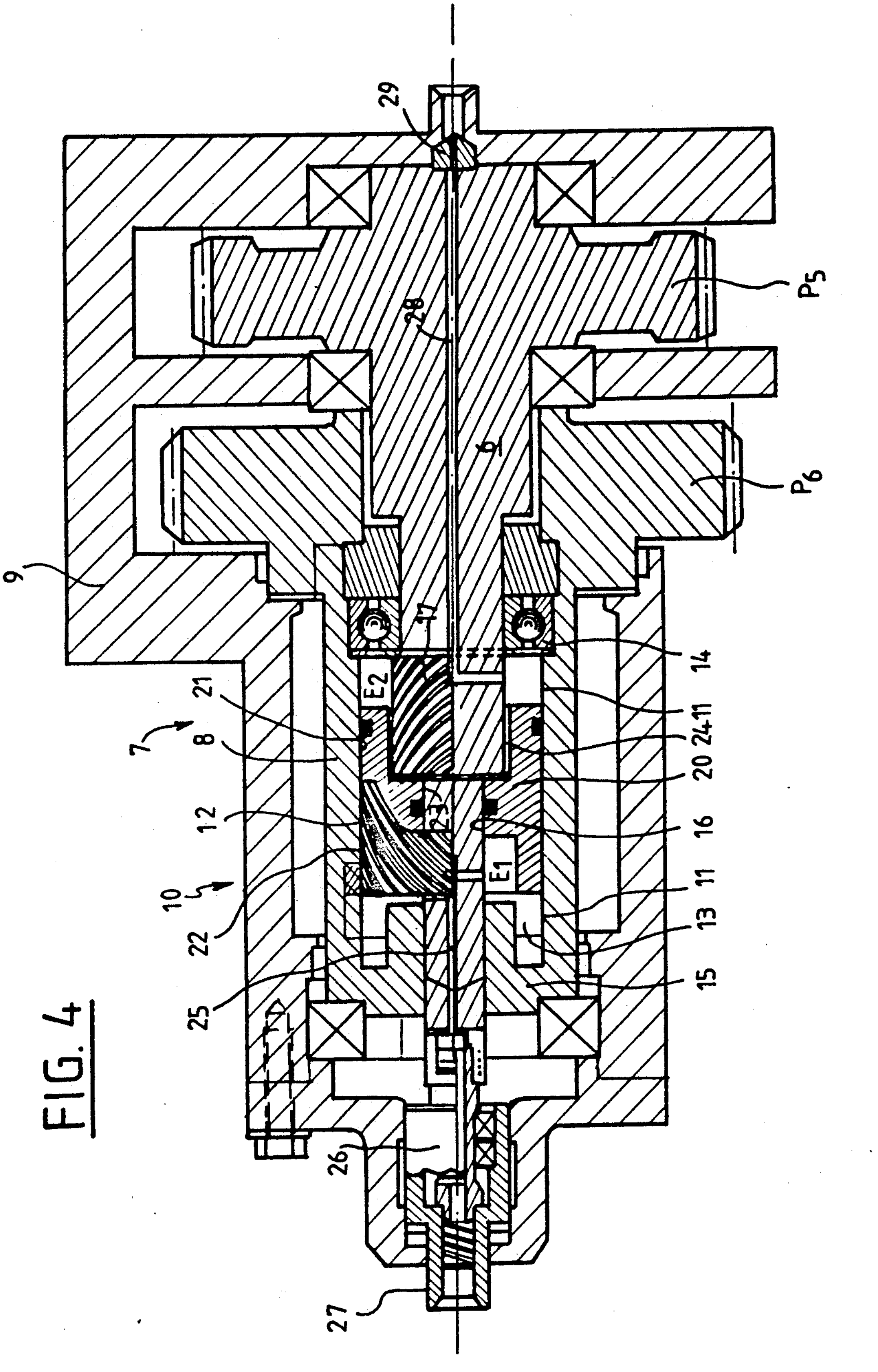
FIG. 4 is a diagrammatic axial cross-sectional view of a phase-shifter used in the vibrator shown in FIGS. 1 through 3.

As shown in FIG. 4, the phase-shifter 7 comprises a fixed structure 9 fastened to the flanges 3, 4 and part of which is cylindrical.

Two coaxial shafts rotate within the structure 9, namely:

- a shouldered central shaft (driving shaft 6) carrying the gear $P_5$ at its end adjacent the flange 4; and
- a hollow shaft (driven shaft 8) rotating around the shouldered shaft 6 and carrying the gear $P_6$ axially offset from the gear $P_5$.

In this construction the gears $P_5$, $P_6$ and their main bearing arrangements are contained in the casing 5 and the cylindrical part 10 of the structure housing the phase-shifter 7 extends through the flange 3 to the outside, parallel to the motors $H_1$, $H_2$.

In the cylindrical part 10, the hollow shaft 8 has a cylindrical inside surface comprising a smooth part 11 and an internally screwthreaded part 12 with helical teeth.

With a cylindrical surface of the shouldered shaft 6, this cylindrical interior surface delimits an annular space 13 closed on one side by a ball bearing 14 by which one of the two shafts 6, 8 is rotatably supported and sealed with respect to the other and, on the other side, by an end wall 15 fastened to the shaft 8 and through which the shaft 6 passes in a fluid-tight manner.

The cylindrical surface of the shaft 6 comprises a smooth part 16 and an externally screwthreaded part 17 with helical teeth.

Inside the annular space 13 is an annular piston 20 comprising:

- a cylindrical outside surface comprising a smooth part 21 which slides in a fluid-tight manner on the smooth part 11 and an externally screwthreaded part 22 which meshes with the internally screwthreaded part 12;
- a cylindrical inside surface comprising a smooth part 23 which slides in a fluid-tight manner on the smooth part of the shaft 6 and an internally screwthreaded part 24 whose helical teeth mesh with the teeth on the externally screwthreaded part 17.

The space $E_1$ between the piston 20, the end wall 15 and the two shafts 6, 8 constitutes a first working chamber (main working chamber) to which a hydraulic fluid may be admitted via an axial passage 25 in the shaft 6. The axial passage 25 discharges into a rotary seal 26 at the end of the shaft 6 whose fixed part is fastened to the structure 9. This fixed part comprises a connecting sleeve 27 to which a hydraulic circuit may be connected.

Likewise, the space $E_2$ between the piston 20, the bearing 14 and the two shafts 6, 8 constitutes a second working chamber into which hydraulic fluid can be admitted via an axial passage 28 in the shaft 6.

This passage discharges into a rotary seal 29 at the end of the shaft 6 whose fixed part is fastened to the structure 9.

The phase-shifter operates as follows:

With no pressure in the working chambers $E_1$ and $E_2$ the drive torque rotating the series 1 of weights M causes a two-fold screwing action between the piston 20 and the shafts 6, 8. This causes axial displacement of the piston 20 until it abuts against the end wall 15.

In this position the weights M of the two-series 1, 2 of weights rotate in opposite phase and their resultant moment is zero.

If pressurized fluid is injected into the working chamber $E_1$ an axial force is applied to the piston 20 which moves it away from the end wall 15 and so generates two-fold relative rotation between the two shafts 6, 8 because of the conjugate action of the external screwthreads 17, 22 on the internal screwthreads 12, 24. Of course, the latter are designed to bring about two-fold relative rotation of the shafts 6, 8 of up to 180° (until the weights M are in phase).

It is clear that this relative rotation is operative only to the degree that the increment in the motor torque resulting from the admission of pressurized fluid into the chamber $E_1$ becomes greater than the resisting torque that the object to which the vibration is imparted opposes to the vibrator (resistance to being driven in).

One advantage of the vibrator previously described is that it eliminates transient phenomena occurring upon stopping and starting the vibrator.

In this case, previously to the period of acceleration or decceleration, during which conventional vibrators sweep through a broad range of vibration frequencies, pressure is established in the working chamber $E_2$ so that the two series of weights are in opposite phase so that during this period the vibrator generates virtually no vibrations. Once normal speed has been achieved or the vibrator has stopped the pressure in the chamber $E_2$ is released until the two series 1, 2 of weights M are in phase because of the pressure in the working chamber $E_1$ and the vibrator consequently generates vibrations along the working axis.

An important advantage of the structure described above is that it is not limited to this "on/off" type of operation.

Provided that an appropriate circuit is used for admitting pressurized fluid into the chamber $E_1$, it can provide a self-governing process which optimizes the efficiency of the vibrator through self-regulation of the vibration amplitude.

A simple way to achieve this is to establish in the chamber $E_1$ during normal operation of the vibrator a pressure adapted to bring about a phase-shift which varies automatically according to the behaviour of the object to which the vibrations are imparted.

If this object is a pile to be driven in, as it is driven in the power dissipated in the soil by friction increases and the resisting torque is amplified until it eventually exceeds the transmitted torque.

This causes the phase-shifter 7 to operate in the direction which returns the weights M to a condition in which they are in phase. The total inertia of the latter and consequently the vibration amplitude are reduced which reduces the amplitude of displacement of the pile and reduces the friction in the ground and therefore the possibility of further driving in.

Because of the previously mentioned limitation of the transmitted power, this self-regulatory process reduces the risk of destruction or damage of the object to which the vibrations are imparted. Also, it prevents excessive power demand on the internal combustion engine used to produce the hydraulic power.

Of course, a converse process would apply if the power dissipated in the soil were reduced.

The secondary chamber $E_2$ of the phase-shifter could advantageously be connected to the hydraulic circuit feeding the motors $H_1$, $H_2$ (represented by the box CH in FIGS. 5 through 7) via a high-pressure valve $HP_3$ set to the maximum permissible pressure in the hydraulic circuit feeding the motors. In this case, if the pressure in the hydraulic circuit CH rises above the pressure $HP_3$ for example because of an increase in the resisting torque, the valve $HP_3$ opens so that the pressurized hydraulic fluid is injected into the secondary chamber $E_2$ of the phase-shifter. This causes the phase-shifter to operate in the direction which returns the weights to a condition in which they are in phase until the pressure of the hydraulic fluid in the circuit CH drops below the pressure $HP_3$.

In the embodiment shown in FIG. 3 the respective positions of the two motors and the phase-shifter have been modified as follows:

- the phase-shifter occupies the place of the motor $H_2$ and meshes via the gear with the gear associated with the motor $H_2$;
- the motor $H_2$ occupies the place of the phase-shifter and drives a first gear $P'_5$ which meshes with the gear $P'_3$ of the phase-shifter and a gear $P'_6$ rotating the series 1 of weights.

The use of two motors $H_1$, $H_2$ of significantly different power output transmits into the phase-shifter half the difference between the instantaneous power outputs of the two motors and consequently causes a pressure in the phase-shifter which is proportional to the total power absorbed by the machine. Selecting a threshold for this power sets the maximum power delivered by the machine to the soil/pile combination during driving. This provides a machine control mode giving priority to power selection. One particular instance of this selection is the maximum power available to the hydraulic motor unit.

The use of two identical motors fed in parallel means that there is no significant torque exerted on the phase-shifter.

Under these conditions, whatever the power demand, the condition of the phase-shifter remains unchanged in the absence of any particular pressure in its working chambers. The moment initially selected will be maintained during driving in. This provides a machine which drives in with a fixed moment (priority to selection of moment).

In the example described above, the motor $H_2$ could be replaced by two motors $H'_2$, $H''_2$ having a total capacity equal to that of the motor $H_1$ (FIG. 3). By supplying either one of the two motors or both motors, it is then possible to choose between two operating modes: power priority/moment priority.

The use of a plurality of hydraulic motors to provide the rotational drive to the vibrator has the additional advantage of enabling the vibration frequency to be varied without using a variable throughput hydraulic pump.

The frequency may be varied by supplying either a particular number of or all of the hydraulic motors, it being understood that the frequency obtained is set by the ratio between the flowrate of the constant flowrate hydraulic pump and the sum of the motor capacities.

Figure 5:
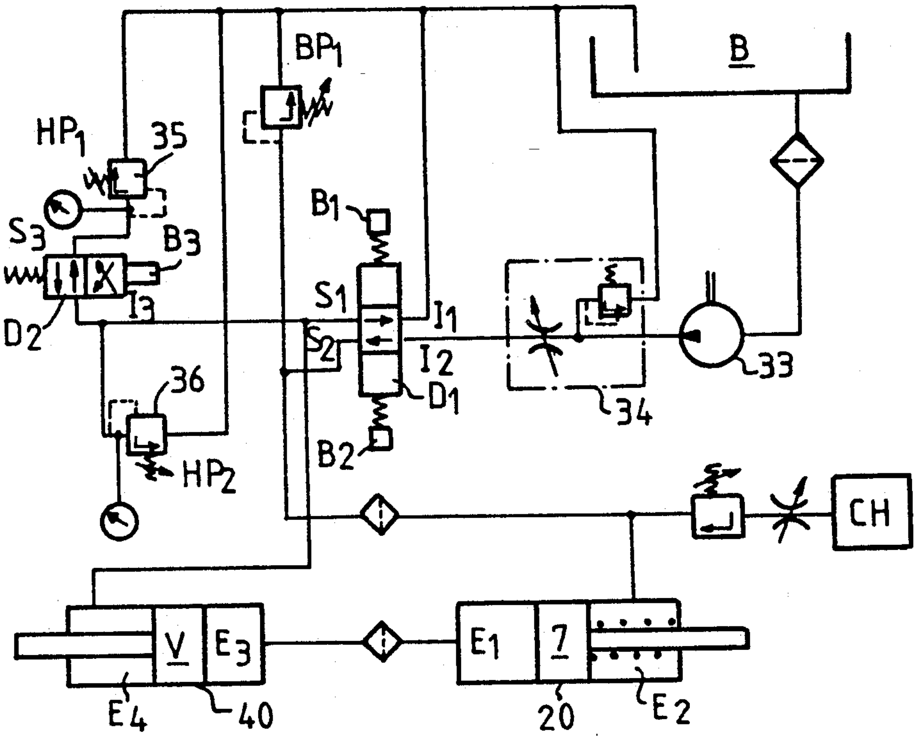
FIGS. 5, 6 and 7 show a hydraulic circuit which can be used to supply power and to control the vibrator shown in FIG. 1.
Figure 6:
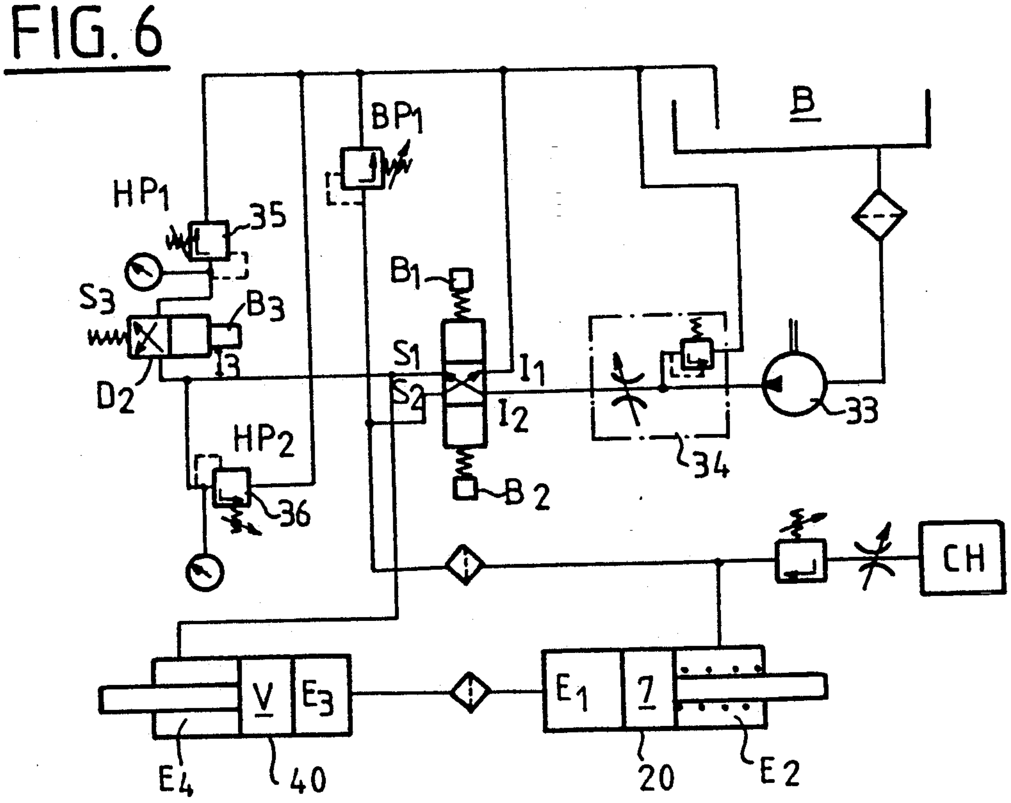
Figure 7:
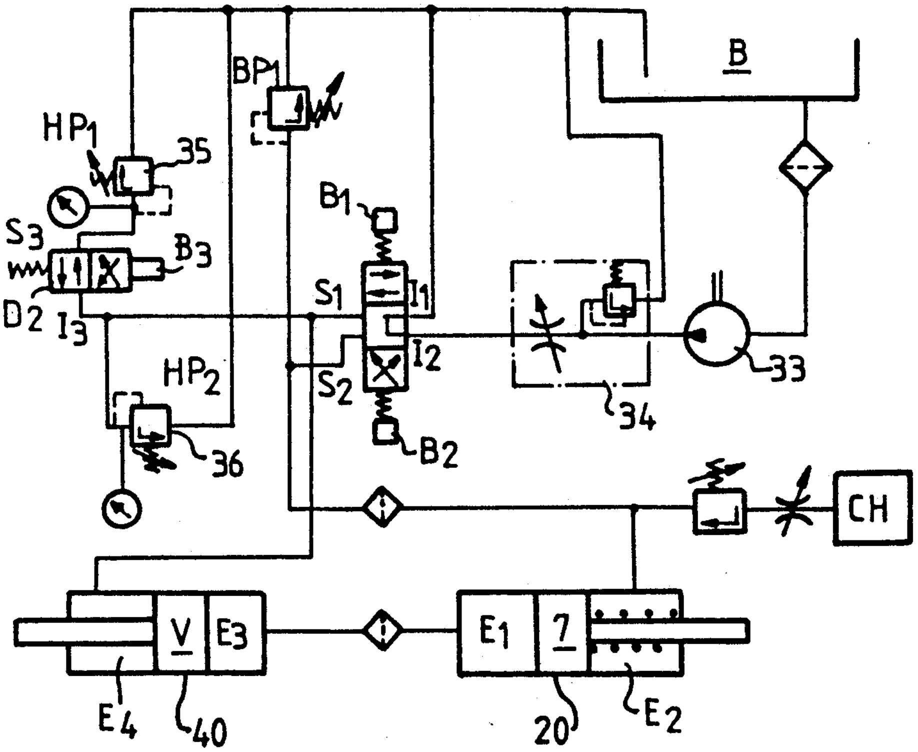

The phase-shifter 7 shown in FIG. 4 may advantageously be controlled by the hydraulic circuit shown in FIGS. 5 through 7.

In these figures the phase-shifter 7 is shown diagrammatically in the form of a double-acting ram comprising a main chamber $E_1$ and a secondary chamber $E_2$. It is biased towards its rest position by a return spring simulating the resistance to driving in.

The main chamber $E_1$ is linked to the discharge chamber $E_3$ of a second ram V whose working chamber $E_4$ is connected to a first outlet $S_1$ of a spool valve $D_1$.

The secondary chamber $E_2$ of the phase-shifter is connected to the second outlet $S_2$ of the spool valve $D_1$ and to a tank B through a valve set to a relatively low pressure $BP_1$ (20 bars in this example).

The inlets $I_1$, $I_2$ of the spool valve $D_1$ are respectively connected to the tank B and to the outlet of a hydraulic pump 33 fitted with a constant flowrate regulator 34. The first outlet $S_1$ of the spool valve $D_1$ is also connected to the tank B via a first return circuit comprising a valve 35 set to a high pressure $HP_1$ and via a second return circuit comprising a spool valve $D_2$ and a valve 36 set to a high pressure $HP_2$ ($HP_2 > HP_1$).

The first spool valve $D_1$ is a three-position valve:

in a stable rest position its inlets $I_1$, $I_2$ communicate with each other so that all of the fluid discharged by the pump 33 is returned to the tank B; the outlets $S_1$, $S_2$ of the spool valve $D_1$ are then shut off (FIG. 7);

in a first unstable position referred to as the forward switching position obtained by pressing a pushbutton $B_1$ it connects the first inlet $I_1$ to its first outlet $S_1$ and its second inlet $I_2$ to its second outlet $S_2$ (FIG. 5);

in a second unstable position referred to as the reverse switching position obtained by pressing a pushbutton $B_2$ it connects its first inlet $I_1$ to its second outlet $S_2$ and its second inlet $I_2$ to its first outlet $S_1$ (FIG. 6).

The second spool valve $D_2$ is operated by a pushbutton $B_3$ against the action of a spring. It has two positions:

in a stable rest position it connects its inlet $I_3$ to its outlet $S_3$ (FIGS. 5 and 7);

in an unstable switched position obtained by pressing the pushbutton $B_3$ its inlet $I_3$ is isolated from its outlet $S_3$ (FIG. 6).

The hydraulic circuit described above operates as follows:

When the spool valves $D_1$ and $D_2$ are in their rest position (FIG. 7) the pressure in the working chamber $E_4$ is the pressure $HP_1$ set by the valve 35 which is less than the pressure $HP_2$ set by the valve 36.

The pressure acting on the phase-shifter 7 is proportional to the pressure $HP_1$ (the factor of proportionality is the ratio of the surface areas of the pistons). This pressure balances the resisting force exerted on the phase-shifter 7.

The position of the piston 40 of the ram V images the position of the piston 20 of the phase-shifter 7 so that the position of the piston rod of the ram V tells the operator the value of the phase-shift produced by the phase-shifter 7.

For the reasons previously explained, this phase-shift (and therefore the position of the piston 40) is not constant but varies according to the behavior of the object to which the vibrations are imparted.

When the spool valve $D_1$ is in its reverse switching position and the spool valve $D_2$ is operated (FIG. 6), the pressure in the chamber $E_4$ of the ram V is the pressure of the fluid injected by the pump 33 which is the pressure $HP_2$ set by the valve 36. Because it is greater than the pressure in the chamber $E_3$ (which represents the resisting force on the phase-shifter 7), the pressure $HP_2$ causes displacement of the pistons 20 and 40 and consequently the phase-shifter 7 applies a varying phase-shift. When this phase-shift reaches the required value the operator ceases to operate the spool valves $D_1$, $D_2$ and the circuit reverts to the state previously described.

When the spool valve $D_2$ is in the rest position and the spool valve $D_1$ is in its forward switching position (FIG. 5), the working chamber $E_4$ of the ram V communicates with the tank B and the fluid injected by the pump 33 is fed to the chamber $E_2$ of the phase-shifter.

The hydraulic pressure $BP_1$ in this chamber displaces the pistons 20 and 40 so that the discharge chamber $E_3$ is filled and the working chambers $E_1$ and $E_4$ are emptied. The phase-shifter 7 therefore applies a varying phase-shift.

For the reasons previously explained the vibrator is made safer by the fact that the chamber $E_2$ of the phase-shifter 7 is connected to the hydraulic circuit feeding the motors $H_1$, $H_2$ via a valve set to a high pressure $HP_3$ and a flowrate limiter. Because of this arrangement, in response to any excessive pressure increase in the hydraulic circuit CH the phase-shifter 7 applies a varying phase-shift and limits the amplitude of the vibrations.

There is claimed:

1. Variable moment vibrator usable for driving objects into the ground comprising at least two series of eccentric weights each comprising at least two eccentric weights rotating about shafts to which are fastened respective gears which mesh with each other so as to rotate in opposite directions and a drive system comprising a first motor coupled to said first series of weights by first gearing and to said second series of weights by a transmission device separate from said first gearing and incorporating a phase-shifter comprising:

a first transmission shaft mounted to rotate on a fixed structure and comprising at least one portion in the form of a cylindrical sleeve whose internal bore comprises a first sealing surface and a first internally screwthreaded part with helical teeth;

a cylindrical second transmission shaft mounted to rotate coaxially with said first transmission shaft and delimiting therewith an annular space closed at one end by an end wall, said second transmission shaft comprising a second sealing surface and a first externally screwthreaded part with helical teeth;

an annular piston member axially mobile in said annular space and having a cylindrical external surface comprising in succession a third sealing surface adapted to slide in fluid-tight manner on said first sealing surface and a second externally screwthreaded part having helical teeth meshing with the teeth of the first internally screwthreaded part and an inside surface comprising in succession a fourth sealing surface adapted to slide in fluid-tight manner on said second sealing surface and a second internally screwthreaded part having helical teeth meshing with the helical teeth of the first externally screwthreaded part; and a pressurized fluid inlet circuit comprising an axial passage in said second transmission shaft which discharges at one end into a working chamber delimited by the two transmission shafts and the annular piston member and at the other end into a distribution passage via a rotary seal mounted at the end of said second transmission shaft.

2. Vibrator according to claim 1 wherein said drive system comprises a second motor coupled to said transmission device between said first motor and said phase-shifter.

3. Vibrator according to claim 1 wherein said drive system comprises a second hydraulic motor coupled to said transmission device between said phase-shifter and said second series of weights.

4. Vibrator according to claim 3 wherein said motors are hydraulic motors of the same capacity in order to obtain vibrations of constant moment.

5. Vibrator according to claim 3 wherein said motors are hydraulic motors with different power outputs so that the phase-shifter pressure is proportional to the total power drawn.

6. Vibrator according to claim 3 further comprising a third hydraulic motor coupled to said second hydraulic motor, said two motors being usable together or separately and having a total capacity equal to that of said first motor whereby constant moment or constant power vibrations can be selected as required.

7. Vibrator according to claim 1 wherein said motor and said phase-shifter are mounted on the same side of said vibrator.

8. Vibrator according to claim 1 wherein said annular piston member delimits a secondary working chamber between said transmission shafts connected to a hydraulic fluid inlet circuit via a second axial passage in said second transmission shaft and a second rotary seal at the opposite end from said first rotary seal.

9. Vibrator according to claim 1 wherein said working chamber of said phase-shifter is connected to the discharge chamber of a ram whose working chamber is connected to a first outlet of a first spool valve via a first return circuit, the position of said ram indicating the phase of said vibrator.

10. Vibrator according to claim 9 wherein said first return circuit comprises a valve set to a first high pressure, said working chamber of said ram is connected to a tank via a second return circuit comprising in succession a second spool valve and a valve set to a second high pressure greater than the first high pressure, said first spool valve has two inlets respectively connected to said tank and to said hydraulic pump and has at least a stable rest position in which its two inlets communicate with each other and its two outlets are shut off and a first switched position in which its first outlet is connected to its second inlet, and said second spool valve has a stable rest position in which its inlet communicates with its outlet and a switched position in which its inlet is isolated from its outlet.

11. Vibrator according to claim 10 wherein said annular piston member delimits a secondary working chamber and said first spool valve comprises a second switched position in which said hyudraulic pump communicates with said secondary working chamber of said phase-shifter and said working chamber of said ram communicates with said tank.

12. Vibrator according to claim 8 wherein the secondary working chamber is connected to said hydraulic circuit which feeds said motor via a valve set to a high pressure representing a permissible pressure in said hydraulic circuit.

* * * * *